(No Model.)
T. N. PARKER.
CLASP.
No. 540,108. Patented May 28, 1895.
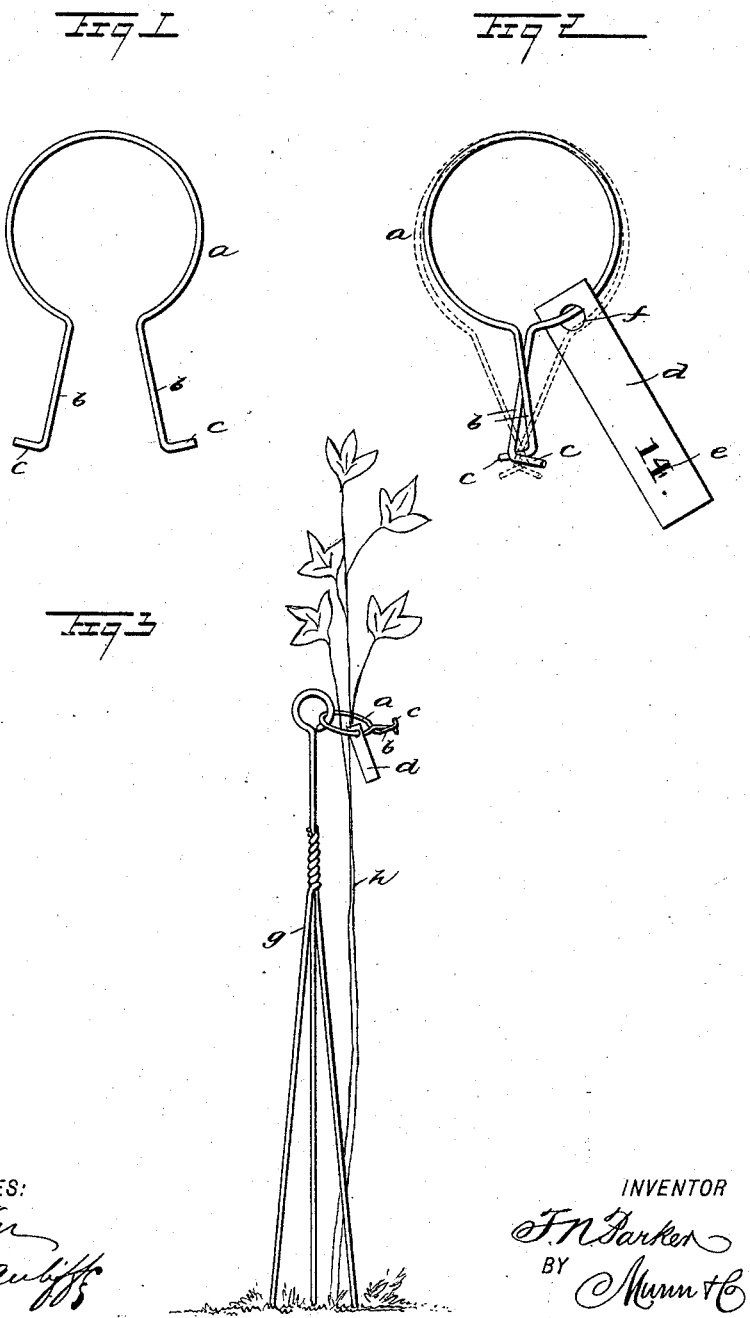
WITNESSES:
H. Walker
J. C. McAuliffe
INVENTOR
T. N. Parker
BY
Munn & Co
ATTORNEYS.

UNITED STATES PATENT OFFICE.

THERON N. PARKER, OF QUICK, IOWA.

CLASP.

SPECIFICATION forming part of Letters Patent No. 540,108, dated May 28, 1895.

Application filed February 18, 1895. Serial No. 538,744. (No model.)

*To all whom it may concern:*

Be it known that I, THERON N. PARKER, of Quick, in the county of Pottawattamie and State of Iowa, have invented a new and Improved Clasp, of which the following is a full, clear, and exact description.

The object of the invention is to provide a clasp especially adapted to the needs of the florist and nurseryman, for tagging plants and trees and for clasping a plant, bush or tree to a stake or other support.

The invention consists in a clasp having the novel features hereinafter particularly described and defined in the claims.

Reference is to be had to the accompanying drawings, forming a part of this specification, in which similar letters of reference indicate corresponding parts in all the views.

Figure 1 is a plan view of a clasp embodying my invention, showing the same open. Fig. 2 is a similar view showing the clasp in closed position and illustrating a tag supported thereon, the dotted lines indicating the expansible nature of the clasp to permit it to yield to the increasing size of a growing plant or tree; and Fig. 3 is a perspective view of the clasp affixed to a stake for supporting a plant, the stake being shown in elevation.

It is desirable in a clasp for the purposes outlined above, that the clasp possess certain characteristics, prominent among which may be mentioned the easy attachment and detachment of the clasp, and the guarding against injury or bruising of the plant, the capability of yielding as the plant increases in diameter, and cheapness of manufacture to warrant the systematic use of the clasp on all plants, &c., in a nursery or florist's establishment. To these and other ends, I form the clasp of wire or equivalent flexible material which is given a loop form, as at $a$, the loop being of a proper size. From the terminal ends of the loop the material is carried outward to form two normally diverging arms $b$, $b$, the resiliency of the spring-like loop serving to normally maintain the arms divergent, as shown in Fig. 1. The free ends of the arms are bent outward as at $c$, in opposite directions.

It will be seen that the diverging arms may be placed against a plant to pass each side thereof, and that the arms will readily yield to guide the plant, without bruising, into the loop $a$, after which the loop is contracted by one's fingers to bring the ends $c$ sufficiently close to each other to enable them to be grasped by the thumb and first finger of one hand, whereupon a slight twist will serve to cross the arms and interlock the outwardly bent ends $c$. These ends are shown bent at about right angles and terminating in free ends or points, but the exact formation may be varied to some extent, the outward bends in opposite directions being the essential feature of these portions of the clasp.

With a growing plant or tree within the loop $a$, it will be clear that the loop will readily yield to the increasing diameter of the plant, and the amount of expansion of the loop will be considerable, as the arms when interlocked, cross at a point close to the loop, as shown in full lines in Fig. 2, but they will gradually separate under the force of the plant until the arms practically are merged into the loop, and the difference between the size of the original loop and the size of the loop plus the combined length of the arms, is therefore the measure of expansion.

In detaching the clasp, the rounding lines of the loop leading to the arms, will also cause the plant to separate the arms and permit the withdrawal of the loop without injuring the plant.

The clasp is in practice usually made to carry a metallic tag $d$, having a number $e$, or other mark of identification, the tag being formed with an eye $f$, to enable it to be slipped onto the clasp, and the latter is then caused to engage a plant or young tree; or the clasp may engage a suitable stake $g$, and clasp a plant $h$ thereto.

In removing the clasp, the ends $c$ are grasped by the fingers of one hand and given a slight twist in the reverse direction to that necessary for their engagement, whereupon it may readily be slipped off.

In practice the clasps are made in various sizes.

Having thus fully described my invention, I claim as new, and desire to secure by Letters Patent—

1. The improved clasp herein described consisting of the open loop, arms departing at one end from the spaced ends of the open loop and diverging toward their outer ends forming a flaring guideway leading into the interior of the loop and provided at the outer ends of the said arms with portions adapted to interlock when brought together substantially as described and shown.

2. The herein-described clasp, having an open loop adapted to encircle a plant, branch, stake or the like, elongated arms at the ends of the loop, and locking ends on the said arms, the said ends when engaged so as to interlock normally holding the arms crossed adjacent to the loop, the connection permitting the outward shifting of the point of crossing of the arms as the loop is expanded, substantially as described.

THERON N. PARKER.

Witnesses:
JNO. M. RITTER,
J. L. McAULIFFE.